United States Patent
Biswal et al.

(10) Patent No.: US 7,974,947 B2
(45) Date of Patent: *Jul. 5, 2011

(54) INCREMENTALLY SYCHRONIZING OCCASIONALLY-CONNECTED MOBILE DATABASES, PRESERVING HORIZONTAL FILTER SCOPE CONSISTENCY BY USING CLIENT PRE-IMAGE

(75) Inventors: Dilip Kumar Biswal, Union City, CA (US); Isaac Kam-Chak Cheng, San Jose, CA (US); Cecilia Oi-Lin Chu, El Dorado Hills, CA (US); Donald Lee Clare, Morgan Hill, CA (US); Louis S. W. Mau, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 398 days.

This patent is subject to a terminal disclaimer.

(21) Appl. No.: 12/131,029

(22) Filed: May 30, 2008

(65) Prior Publication Data

US 2008/0228858 A1    Sep. 18, 2008

Related U.S. Application Data

(63) Continuation of application No. 10/985,421, filed on Nov. 10, 2004, now Pat. No. 7,395,280.

(51) Int. Cl.
*G06F 17/00* (2006.01)
(52) U.S. Cl. .................................. 707/625; 709/203
(58) Field of Classification Search .......................... None
See application file for complete search history.

(56) References Cited

U.S. PATENT DOCUMENTS

| | | | |
|---|---|---|---|
| 5,758,337 A | 5/1998 | Hammond | |
| 5,870,759 A | 2/1999 | Bauer et al. | |
| 5,870,765 A | 2/1999 | Bauer et al. | |
| 5,884,325 A | 3/1999 | Bauer et al. | |
| 5,926,816 A | 7/1999 | Bauer et al. | |
| 5,946,629 A | 8/1999 | Sawyer et al. | |
| 6,091,958 A | 7/2000 | Bergkvist et al. | |
| 6,198,738 B1 | 3/2001 | Chang et al. | |
| 6,212,529 B1 | 4/2001 | Boothby et al. | |
| 6,401,104 B1 | 6/2002 | LaRue et al. | |
| 6,542,500 B1 | 4/2003 | Gerszberg et al. | |
| 6,567,823 B1 | 5/2003 | Rothschild | |
| 6,643,669 B1 | 11/2003 | Novak et al. | |
| 6,694,335 B1 * | 2/2004 | Hopmann et al. | 707/624 |
| 6,694,337 B1 | 2/2004 | King et al. | |
| 6,732,122 B2 | 5/2004 | Zoltan | |
| 6,732,144 B1 | 5/2004 | Kizu et al. | |
| 6,735,587 B2 | 5/2004 | Colby et al. | |

(Continued)

*Primary Examiner* — Apu M Mofiz
*Assistant Examiner* — Hung D Le
(74) *Attorney, Agent, or Firm* — Sawyer Law Group, P.C.

(57) ABSTRACT

A system for synchronizing data on a first device with data at a second device, includes: determining a pre-image of the data on the first device according to a filter after a previous synchronization with the data at the second device; determining a current image of the data at the second device according to the filter; determining a delta of the current image, where the delta comprises data that exists in the current image and has changed since the previous synchronization; instructing the first device to delete data that exists in the pre-image but not in the current image; and instructing the first device to UPSERT a union of the data that exists in the delta and the data that exists in the current image but not the pre-image. This is efficient in time and bandwidth resources while also providing consistent data integrity.

6 Claims, 9 Drawing Sheets

U.S. PATENT DOCUMENTS

| | | |
|---|---|---|
| 6,848,008 B1 | 1/2005 | Sevanto et al. |
| 2003/0182327 A1 | 9/2003 | Ramanujam et al. |
| 2003/0220966 A1 | 11/2003 | Hepper et al. |
| 2004/0122870 A1 | 6/2004 | Park et al. |
| 2004/0128327 A1 | 7/2004 | Shi et al. |
| 2004/0133568 A1 | 7/2004 | Witkowski et al. |
| 2004/0139235 A1 | 7/2004 | Rashid et al. |

* cited by examiner

INCREMENTALLY SYCHRONIZING OCCASIONALLY-CONNECTED MOBILE DATABASES, PRESERVING HORIZONTAL FILTER SCOPE CONSISTENCY BY USING CLIENT PRE-IMAGE

CROSS-REFERENCES TO RELATED APPLICATIONS

The present application claims the benefit of priority under 35 USC 120 to U.S. application Ser. No. 10/985,421, filed Nov. 10, 2004, entitled "INCREMENTALLY SYNCHRONIZING OCCASIONALLY-CONNECTED MOBILE DATABASES, PRESERVING HORIZONTAL FILTER SCOPE CONSISTANCY BY USING CLIENT PRE-IMAGE," the contents of which are hereby incorporated in their entirety.

FIELD OF THE INVENTION

The present invention relates to data synchronization, and more particularly to data synchronization subject to a filter.

BACKGROUND OF THE INVENTION

FIG. 1 illustrates a conventional system for data synchronization. The system includes a server 101 that stores data in a database and a device 103 that stores a subset of the data stored on the server 101. The subset is defined by a filter 102. Occasionally, the device 103 connects to the server 101 to synchronize its copy of the subset with that stored at the server 101.

In one conventional method for data synchronization, the server 101 sends every row in the database that satisfied the filter 102 each time the device 103 requests synchronization. However, this method wastes time and network bandwidth resource, particularly valuable in mobile computing.

In another conventional method for data synchronization, the server 101 sends only those rows that satisfy the filter 102 and have been changed since the last synchronization. However, this method results in data integrity problems, known as "filter-scope out-of-sync". The problem occurs in three ways: (1) a row inside the scope is updated so that it is outside the scope, such that the row is not deleted from the device upon synchronization (condition C1); (2) the scope of the filter changes since the last synchronization, such that a row that is outside the changed filter scope is not deleted from the device upon synchronization (condition C2); and (3) the scope of the filter changes since the last synchronization, such that a row that is unchanged but is within the changed filter scope is not inserted into the device upon synchronization (condition C3). The data integrity problems are further described with reference to FIGS. 2A-4B.

FIGS. 2A-2B illustrate condition C1 of the data integrity problem. As illustrated in FIG. 2A, assume that the server 101 has a domain table (DT) with two columns: pk (primary key), and x (data value). The device 103 subscribed DT with the filter: x>5. Initially, the device 103 is sent rows (1, 10) and (2, 18) because 10>5 and 18>5. As illustrated in FIG. 2B, assume that before the next synchronization, row (1, 10) at the server 101 is updated to (1, 2). Row (1, 2) does not satisfy the filter. In the next synchronization, row (1, 2) is not sent to the device 103. However, row (1, 10) is not deleted from the device 103. As a result, for the same primary key, the device 103 has the data value 10 while the server 101 has the data value 2. The data on the device 103 thus becomes out-of-sync with the data on the server 101.

FIGS. 3A-3B illustrate condition C2 of the data integrity problem. As illustrated in FIG. 3A, the database contains rows R1 and R2 in a domain table. The filter is: x IN (SELECT zipcode FROM Zipcode Table WHERE city='San Jose'). This filter applies to the domain table at the server 101 to define a subset of rows that a device receives. The filter references a look-up table ("Zipcode Table" is the look-up table in this example) on the server 101 to look up data that defines the scope of the filter. Initially, the device 103 receives rows R1 and R2 since they satisfy the filter. As illustrated in FIG. 3B, assume that the look-up table is updated such that R2 no longer satisfies the filter. For example, the zip code in R2 is reassigned to a city other than San Jose. In the next synchronization, only R1 satisfies the filter. However, R2 is not deleted from the device 103, resulting in the data on the device 103 becoming out-of-sync with the data at the server 101.

FIGS. 4A-4B illustrate condition C3 of the data integrity problem. In this example, the same domain table and filter as FIGS. 3A-3B are used. As illustrated in FIG. 4A, initially, the device 103 receives rows R1 and R2 since they satisfy the filter. As illustrated in FIG. 4B, assume that the look-up table is updated such that R3 satisfies the filter. For example, the zip code in R3 is reassigned to the city of San Jose. However, in the next synchronization, R3 is not sent to the device 103 since the row itself has not changed. Thus, the data on the device 103 becomes out-of-sync with the data on the server 101.

In another conventional method, the data integrity problem described above is addressed by having the device 103 apply a filter to find out-of-scope data after the synchronization and delete them. However, this approach does not eliminate condition C3. This approach also has additional drawbacks. The device 103 must subscribe to all look-up tables and all columns referenced in the filter, and none of the look-up tables can have a filter on it. The filter processing during synchronization thus requires additional time and network bandwidth resources. Also, the filter may not work correctly if the device 103 and the server 101 are from different vendors, since each database vendor may have its own syntax and semantic variants for the filter process.

Accordingly, there is a need for a method and system for preserving filter scope consistency in synchronizing data. The method and system should be efficient in time and bandwidth resources while also providing consistent data integrity. The present invention addresses such a need.

SUMMARY OF THE INVENTION

A method and system for synchronizing data on a first device with data at a second device, includes: determining a pre-image of the data on the first device according to a filter after a previous synchronization with the data at the second device; determining a current image of the data at the second device according to the filter; determining a delta of the current image, where the delta comprises data that exists in the current image and has changed since the previous synchronization; instructing the first device to delete data that exists in the pre-image but not in the current image; and instructing the first device to UPSERT a union of the data that exists in the delta and the data that exists in the current image but not the pre-image. This is efficient in time and bandwidth resources while also providing consistent data integrity.

DETAILED DESCRIPTION

The present invention provides a method and system for preserving filter scope consistency in synchronizing data. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 5 through 9B in conjunction with the discussion below.

Figure 1:
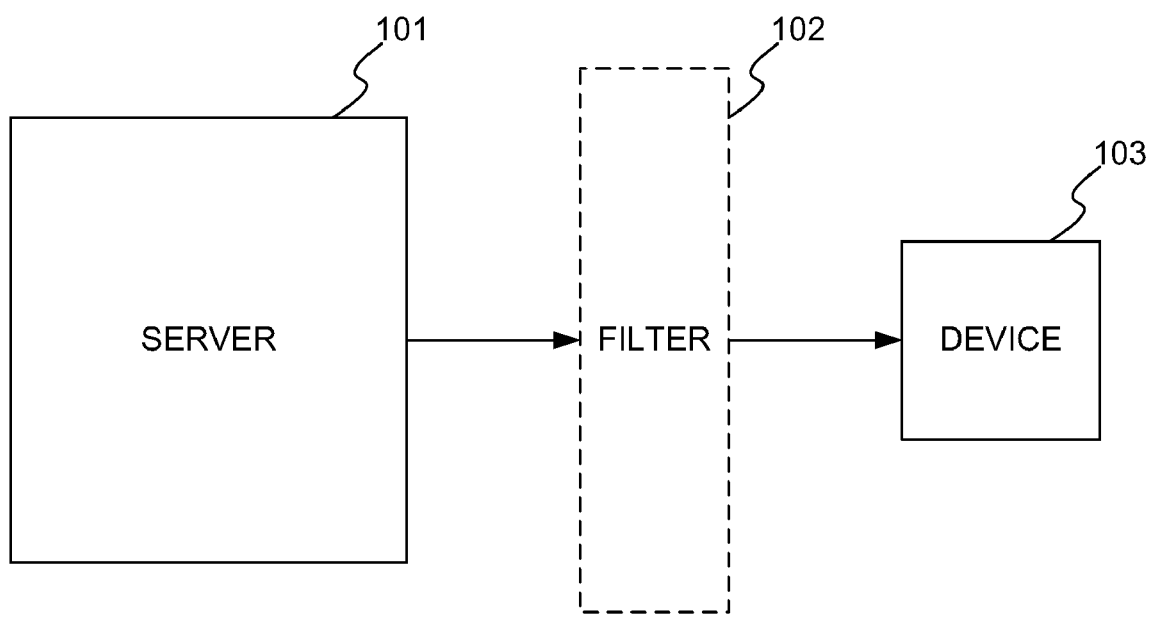
FIG. 1 illustrates a conventional system for data synchronization.
Figure 2A:
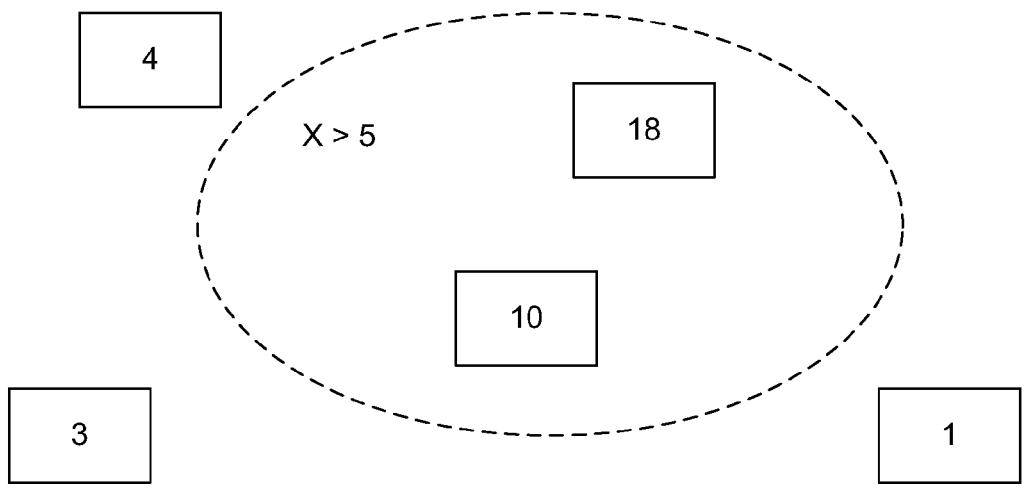
FIGS. 2A-4B illustrate the data integrity problem with conventional methods of data synchronization.
Figure 2B:
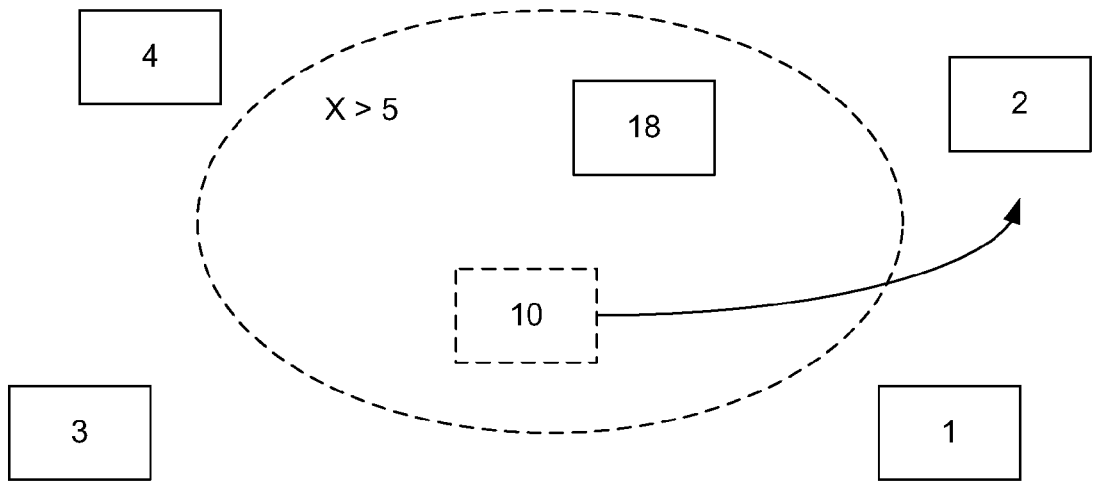
Figure 3A:
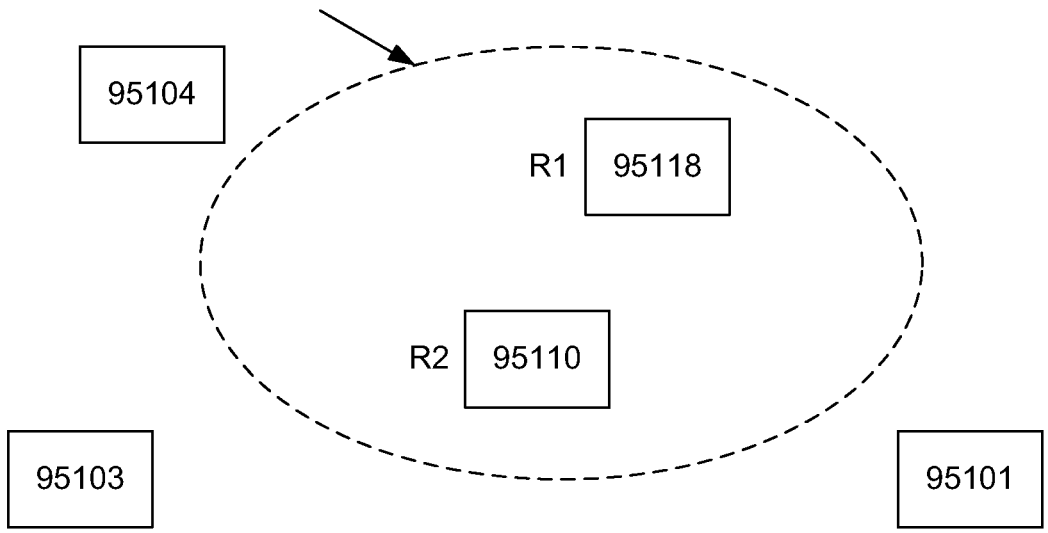
Figure 3B:
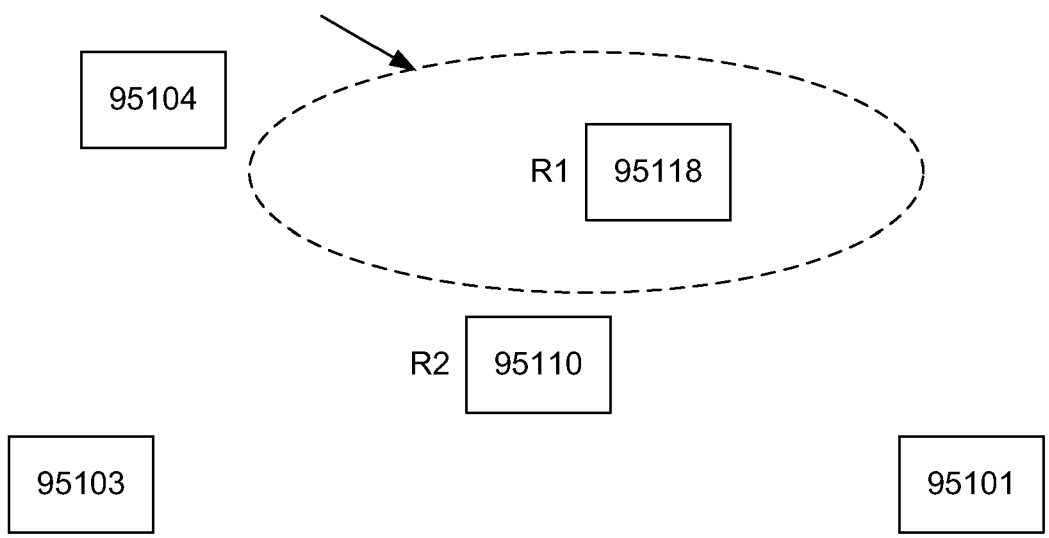
Figure 4A:
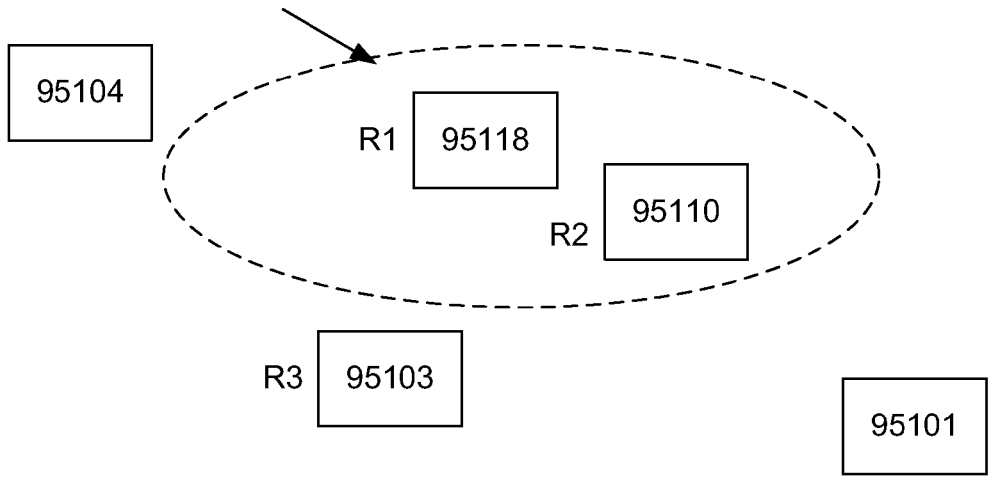
Figure 4B:
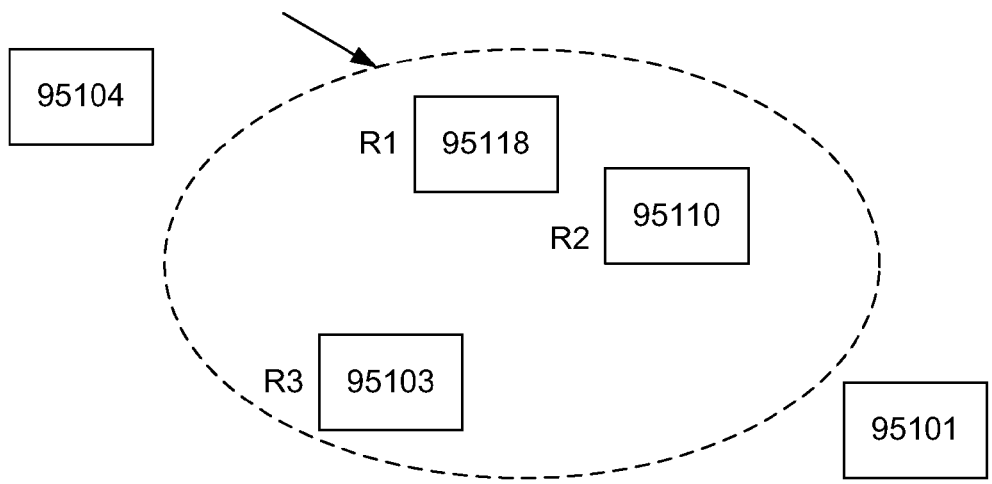
Figure 5:
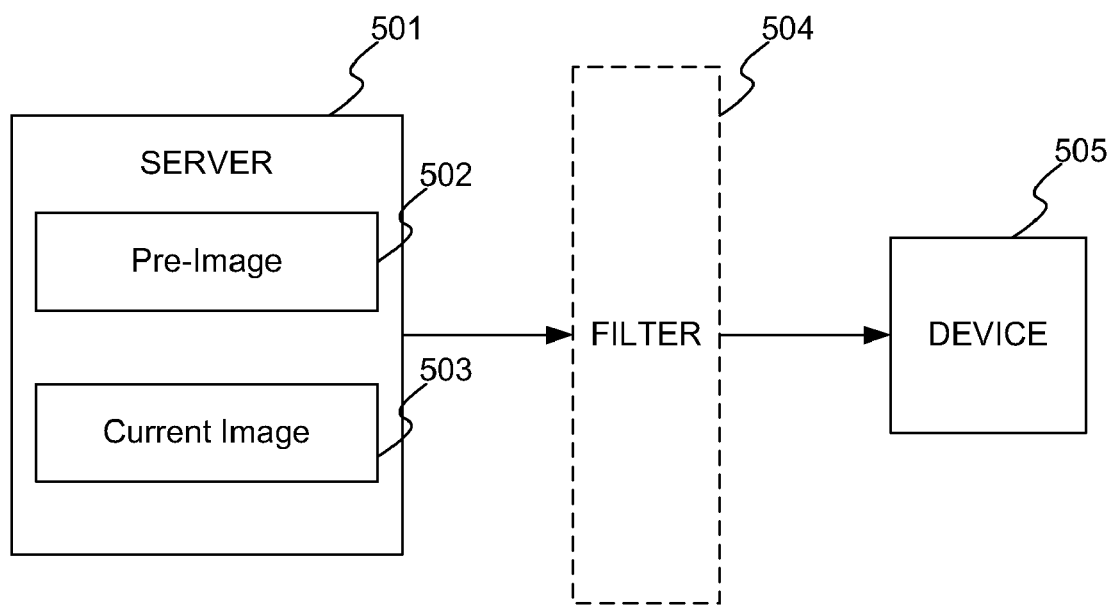
FIGS. 5 and 6 illustrate a preferred embodiment of a system and method, respectively for preserving filter scope consistency in synchronizing data in accordance with the present invention.
Figure 6:
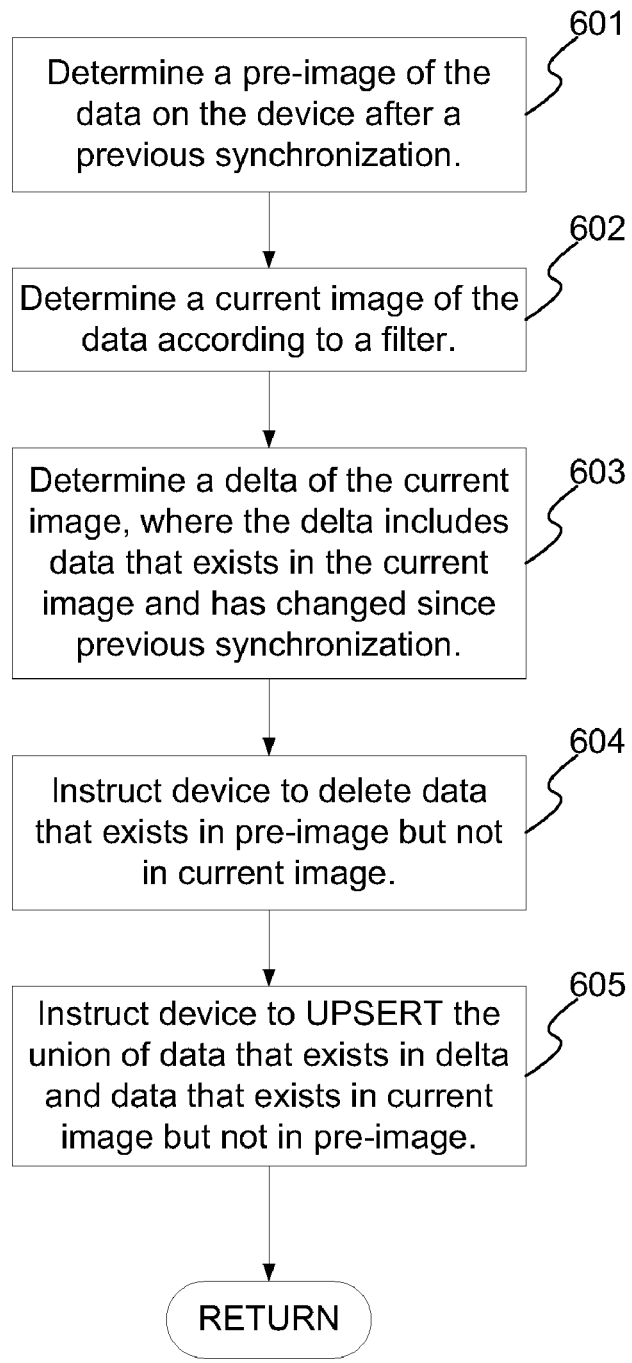

FIGS. 5 and 6 illustrate a preferred embodiment of a system and method, respectively for preserving filter scope consistency in synchronizing data in accordance with the present invention. The system includes a server 501 or anything that stores data and a device 505 that stores a subset of the data stored on the server 501. Occasionally, the device 505 connects to the server 501 to synchronize its copy of the subset with that stored at the server 501. The subset is defined by a filter 504. The server 501 is capable of determining a pre-image 502 of the data on the device 505 after a previous synchronization, via step 601. During a current synchronization, the server 501 determines the current image 503 of the data according to the filter 504, via step 602, i.e., the data the device 505 should have after the synchronization. Next, the server 501 determines a delta of the current image 503, via step 603, where the delta includes data that changed since the previous synchronization and that exists in the current image 503. The server 501 then instructs the device 505 to delete the data that exists in the pre-image 502 but not in the current image 503, via step 604. The server 501 further instructs the device 505 to UPSERT the union of the data that exists in the delta and the data that exists in the current image 503 but not in the pre-image 502, via step 605.

The UPSERT operation is an operation on a row (R) into a target table (T) with the following properties:
(1) Before performing the UPSERT operation, if R is already in T, then the UPSERT operation is logically equivalent to a SQL update operation.
(2) Before performing the UPSERT operation, if R is not in T, then the UPSERT operation is logically equivalent to a SQL insert operation.

Although the present invention is described as a two-tier system, any number of tiers is possible without departing from the spirit and scope of the present invention. For example, the server side can have a data storage tier and a middle tier that performs the actual synchronization. Also, there can be multiple devices in each tier. For example, a plurality of servers can reside at the server side or a plurality of devices at the device side.

Figure 7A:
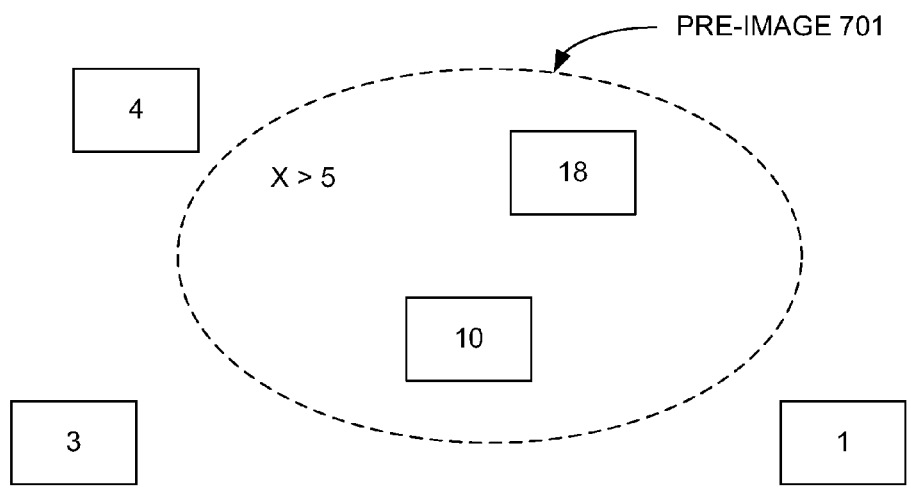
FIGS. 7A-9B illustrate how the method and system in accordance with the present invention avoids the data integrity problems.
Figure 7B:
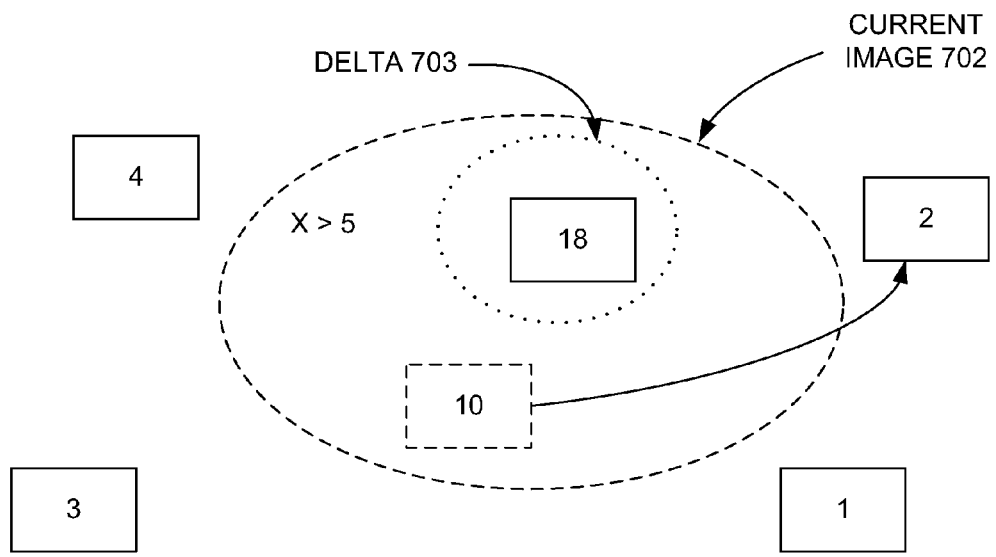

FIGS. 7A-7B illustrate how the present invention avoids condition C1. As illustrated in FIG. 7A, assume that the server 501 has a domain table with two columns: pk (primary key), and x (data value). The device 505 subscribes to the domain table with the filter: x>5. Initially, the device 505 is sent rows (1, 10) and (2, 18) because 10>5 and 18>5. As illustrated in FIG. 7B, assume that before the next synchronization, row (1, 10) is updated to (1, 2). Row (1, 2) does not satisfy the filter. In the next synchronization, the server 501 determines the pre-image 701, via step 601, which contains rows (1, 10) and (2, 18). The server 501 also determines a current image 702 according to the filter, via step 602, which contains the row (2, 18). The server 501 next determines the delta 703, via step 603, which includes row (2, 18) if this row changed since the previous synchronization. The server 501 next instructs the device 505 to delete row (1, 10), via step 604, since this row exists in the pre-image 701 but not in the current image 702. Via step 605, the server 501 further instructs the device 505 to UPSERT the row (2, 18) (row that exists in the delta 703). In the UPSERT operation, row (2, 18) is updated. The integrity of the data on the device 505 is maintained.

Figure 8A:
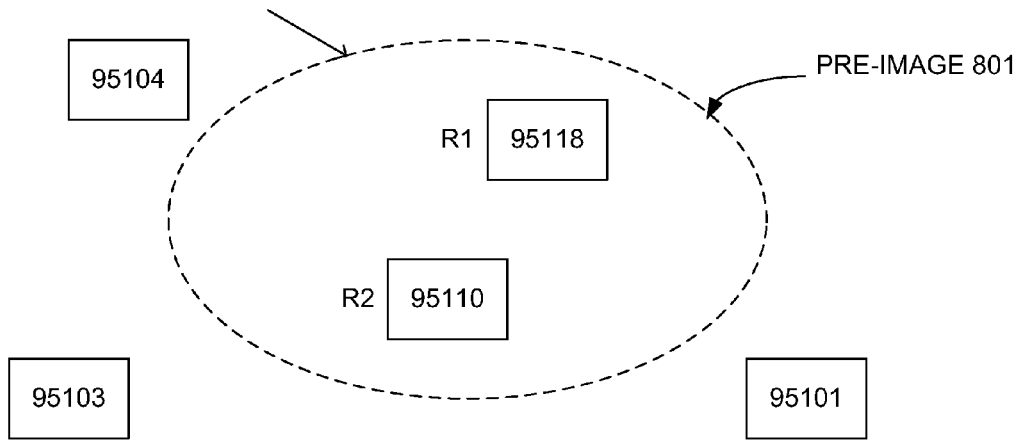
Figure 8B:
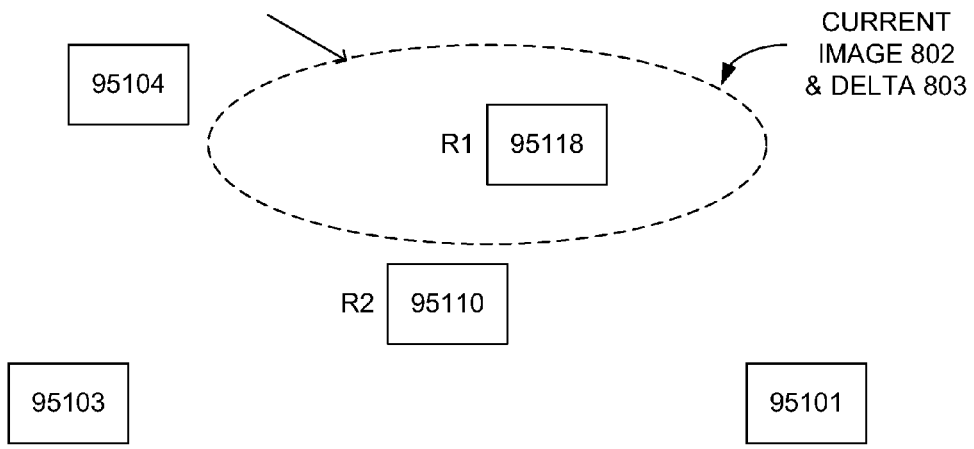

FIGS. 8A-8B illustrate how the present invention avoids condition C2. As illustrated in FIG. 8A, the database contains rows R1 and R2 in a domain table. The filter is: x IN (SELECT zipcode FROM Zipcode Table WHERE city='San Jose'). Initially, the device 505 receives rows R1 and R2 since they satisfy the filter. As illustrated in FIG. 8B, assume that the look-up table is updated such that R2 no longer satisfies the filter. For example, the zip code in R2 is reassigned to a city other than San Jose. In the next synchronization, the server 501 determines the pre-image 801, via step 601, which contains rows R1 and R2. The server 501 also determines a current image 802 according to the filter, via step 602, which contains row R1. The server 501 next determines the delta 803, via step 603, which includes row R1 if this row changed since the previous synchronization. The server 501 next instructs the device 505 to delete row R2, via step 604, since this row exists in the pre-image 801 but not in the current image 802. Via step 605, the server 501 further instructs the device 505 to UPSERT row R1 (row that exists in the delta 803; there are no rows that exist in the current image 802 but not in the pre-image 801). In the UPSERT operation, row R1 is updated. The integrity of the data on the device 505 is maintained.

Figure 9A:
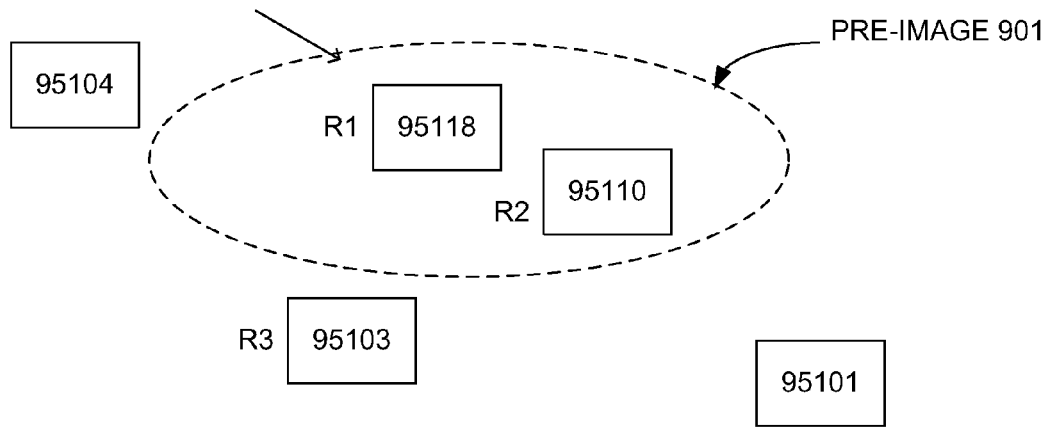
Figure 9B:
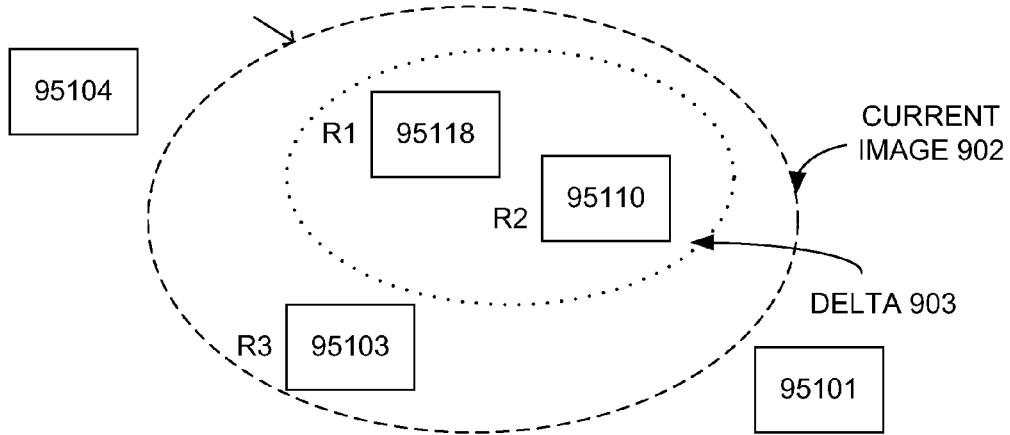

FIGS. 9A-9B illustrate how the present invention avoids condition C3. In this example, the same domain table and filter as FIGS. 8A-8B are used. Initially, the device 505 receives rows R1 and R2 since they satisfy the filter. As illustrated in FIG. 9B, assume that the look-up table is updated such that R3 satisfies the filter. For example, the zip code in R3 is reassigned to the city of San Jose. In the next synchronization, the server 501 determines the pre-image 901, via step 601, which contains rows R1 and R2. The server 501 also determines a current image 902 according to the filter, via step 602, which contains rows R1, R2, and R3. The server 501 next determines the delta 903, via step 603, which includes row R1 and/or R2, if either of these rows changed since the previous synchronization. The server 501 next determines what rows to delete from the device 505, via step 604. Since there are no rows that exist in the pre-image 901 but not in the current image 902, the server 501 does not instruct the device 505 to delete any rows. Via step 605, the server 501 instructs the device 505 to UPSERT rows R1 and R2 (rows that exist in the delta 903) and row R3 (row that exists in the current image 902 but not in the pre-image 901). In the UPSERT operation, rows R1 and R2 are updated and row R3 is inserted. The integrity of the data on the device 505 is maintained.

The method and system for preserving filter scope consistency in synchronizing data has been disclosed. The method and system determines a pre-image of the data on the device after a previous synchronization, determines a current image of the data according to a filter, determines a delta of the current image, wherein the delta comprises data that exists in the current image and has changed since the previous synchronization, instructs the device to delete data that exists in the pre-image but not in the current image, and instructs the device to UPSERT a union of the data that exists in the delta and the data that exists in the current image but not the pre-image. The method and system are efficient in time and bandwidth resources while also providing consistent data integrity.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer readable storage medium containing program instructions for synchronizing data stored on a client device with data stored on a server, wherein execution of program instructions by one or more processors of a computer system causes the one or more processors to carry out the steps of:
   the server determining a pre-image of the data stored on the client device, the pre-image being data stored on the client device as of a time of previous synchronization with the data stored on the server, the pre-image further being a subset of the data stored on the server as defined by a filter;
   the server determining a current image of the data stored on the server, the current image being data stored on the server that satisfies the filter as of a time of a current synchronization, the current image further being data that is to be stored on the client device as of the time of the current synchronization;
   the server determining a delta of the current image, the delta comprising data that exists in the current image and which has changed since the time of the previous synchronization;
   the server instructing the client device to delete data that exists in the pre-image but not in the current image; and
   the server instructing the client device to UPSERT a union of the data that exists in the delta and the data that exists in the current image but not the pre-image, the USPERT being an operation that is logically equivalent to a SQL update operation for rows of data that already exist within a table of the client device at the time of the current synchronization, the UPSERT further being an operation that is logically equivalent to a SQL insert operation for rows of data that are not within a table of the client device at the time of the current synchronization.

2. The computer readable storage medium of claim 1, wherein the pre-image comprises a subset of the data stored on the server that satisfies the filter at the time of the previous synchronization.

3. The computer readable storage medium of claim 1, wherein the delta comprises a subset of the data stored on the server that has changed since the time of the previous synchronization and that satisfies the filter.

4. The computer readable storage medium of claim 1, wherein the computer readable storage medium further comprises executable program instructions for:
   the client device storing data that exists in the current image but not in pre-image; and
   the client device updating data stored on the client device that exists in the delta and in the pre-image.

5. A system comprising:
   a server configured to store data; and
   a client device configured to store a subset of the data stored on the server, the subset being defined by a filter,
   wherein responsive to a request of the client device to synchronize the subset with the data stored on the server, the server is further configured to:
      determine a pre-image of the subset of data stored on the client device, the pre-image being data stored on the client device as of a time of a previous synchronization with the data stored on the server:
      determine a current image of the data stored on the server that satisfies the filter as of a time of a current synchronization;
      determine a delta of the current image, the delta comprising data that exists in the current image and which has changed since the time of the previous synchronization:
      instruct the client device to delete data that exists in the pre-image but not in the current image; and
      instruct the client device to UPSERT a union of the data that exists in the delta and the data that exists in the current image but not the pre-image, the USPERT being an operation that is logically equivalent to a SQL update operation for rows of data that already exist within a table of the client device at the time of the current synchronization, the UPSERT further being an operation that is logically equivalent to a SQL insert operation for rows of data that are not within a table of the client device at the time of the current synchronization.

6. The system of claim 5, wherein the client device inserts data that exists in the current image but not in pre-image, and updates data that exists in the delta and in pre-image.

* * * * *